United States Patent [19]
Yong-Set

[11] Patent Number: 5,655,329
[45] Date of Patent: Aug. 12, 1997

[54] CLIP FOR ATTACHING ARTICLES TO A LINE

[76] Inventor: Bernard Yong-Set, 63 Chapel Park Square, Scarborough, Ontario, Canada, M1V 2S3

[21] Appl. No.: 679,246

[22] Filed: Jul. 12, 1996

[51] Int. Cl.[6] .................................................. H01K 91/03
[52] U.S. Cl. ........................ 43/44.92; 43/44.83; 24/601.8
[58] Field of Search ............................... 43/44.83, 44.92, 43/44.95, 43.1; 224/103; 24/908, 601.8, 131 R; D22/134

[56] References Cited

U.S. PATENT DOCUMENTS

| | | | |
|---|---|---|---|
| 1,735,787 | 11/1929 | Peterson | 24/131 R |
| 2,371,295 | 3/1945 | Hopkins | 24/601.8 |
| 2,720,014 | 10/1955 | Caldwell | 24/908 |
| 3,122,803 | 3/1964 | Boggess et al. | 24/908 |
| 4,234,998 | 11/1980 | McMickle | 24/601.3 |
| 4,696,120 | 9/1987 | Schroeder | 43/44.83 |
| 4,696,121 | 9/1987 | Hernden | 48/17.2 |
| 4,759,103 | 7/1988 | Henderson | 24/236 |
| 5,042,191 | 8/1991 | Fett | 43/44.83 |

*Primary Examiner*—Jeanne Elpel
*Attorney, Agent, or Firm*—Merek & Voorhees

[57] ABSTRACT

A clip for attaching fishing hooks, lures, or other objects to a line. The clip comprises an elongate body having a central support member bridging first and second loop portions formed at either end thereof; a first arm member that is an extension of the first loop portion and that ends in an overturned u-shaped hook; and, a second arm member that is an extension of the second loop portion and that ends in a ring. The ring is positioned below and adjacent to the central support member and in a plane approximately perpendicular to the first and second loop portions. When the clip is open the overturned u-shaped hook is disengaged from the remainder of the clip. When the clip is closed the overturned u-shaped hook is received upwardly through the ring and around the central support member with the free end of the overturned u-shaped hook protruding downwardly back through the ring.

11 Claims, 2 Drawing Sheets

5,655,329

CLIP FOR ATTACHING ARTICLES TO A LINE

This application claims the benefit of U.S. provisional application Ser. No. 60/001,357, filed Jul. 21, 1995.

FIELD OF THE INVENTION

This invention relates to a clip that may be used to attach articles to the end of a line. In particular, the invention relates to a new and improved clip to attach articles to the end of a rope, cable or line and to a clip that cannot easily become undone during use.

BACKGROUND OF THE INVENTION

Finding a simple, strong and reliable method to releasably secure articles onto the end of a line, cable, or rope has always been a concern. This particular problem is commonly faced by fisherman when attempting to secure a lure, hook or other article to the end of a rope, cable or fishing line. For example, sport fishermen typically utilize a fishing rod and a reel that carries a length of fishing line, onto the end of which is attached either a lure or some form of hook. Traditionally the lure or hook has been attached to the line by means of one of a large variety of different types of knots that have been developed over time. However, a number of inherent disadvantages are related to the use of knots to tie lures or hooks to fishing lines.

These disadvantages include the difficulty of tying knots in lines (particulary in low light or cold conditions), the tendency of certain types of knots to slip or become undone, and the requirement to cut the line and re-tie a new knot every time a hook or lure is changed.

In light of the problems and difficulties presented by the use of a knot, others have proposed numerous mechanisms and manners in which to attach hooks and lures to the end of a fishing line. One such device that has been developed is known generally as a fishing snap or clip. These devices are usually tied to the end of the fishing line and provide a means to releasably secure a hook or lure to the line. Most commonly hooks or lures are attached to a clip or snap through the use of a an integrated loop portion which may be readily opened and closed.

While such devices have traditionally eliminated many of the difficulties associated with attaching articles to a line, they too suffer from their own inherent short comings. The most significant limitation associated with currently designed and available snaps or clips is the fact that they can be inadvertently opened when exposed to tensile loading or when squeezed. For example, where a fisherman hooks a larger than expected fish, the weight or strength of the fish may put sufficient tensile loading upon the clip to force it open thereby releasing the lure or hook from the fishing line. Similarly, should a lure or hook become entangled or snagged on debris or objects in the water, pulling on the fishing line can cause traditional clips to inadvertently and unexpectedly open, again resulting in a lost hook or lure. Furthermore, there is also the tendency for such existing products to gradually fail with increased tensile loading. For example, in a fishing scenario if a hook or lure becomes entangled in debris in the water and is eventually pulled free by the fisherman, the snap or clip could be deformed or weakened without undergoing appreciable visual changes that are readily identifiable by the fisherman. Should that same clip then be used in a situation where a large fish is caught, that fish may be of sufficient size or strength to cause the now weakened clip to fail. It has also been known for larger fish to bite down on a clip, thereby forcing it open.

SUMMARY OF THE INVENTION

The invention therefore provides a new and novel clip design that overcomes these limitations. The new clip securely holds articles onto the end of a line and reduces or eliminates accidental or inadvertent opening.

Accordingly, in one of its aspects the invention provides a clip for attaching fishing hooks, lures, or other objects to a line, the clip comprising: an elongate body having a central support member bridging first and second loop portions formed at either end thereof, said first and second loop portions providing means to attach said fishing hooks, lures, or other objects to said line, a first arm member, said first arm member being an extension of said first loop portion and ending in an overturned u-shaped hook; and, a second arm member, said second arm member being an extension of said second loop portion and ending in a ring, said ring positioned below and adjacent said central support member and in a plane approximately perpendicular to said first and second loop portions, said clip having an open and a closed position, when in said open position said overturned u-shaped hook being disengaged from the remainder of said clip, when in said closed position said overturned u-shaped hook being received upwardly through said ring and around said central support member with the free end of said overturned u-shaped hook protruding downwardly back through said ring.

In a further aspect the first loop portion provides a biasing force to the first arm member urging the first arm member away from the central support member such that when the clip is in its closed position the overturned u-shaped hook is held within the ring and around the central support member.

Further objects and advantages of the invention will become apparent from the following description taken together with the accompanying drawings.

BRIEF DESCRIPTION OF THE DRAWINGS

For a better understanding of the present invention, and to show more clearly how it may be carried into effect, reference will now be made, by way of example, to the accompanying drawings which show the preferred embodiments of the present invention in which.

DESCRIPTION OF THE PREFERRED EMBODIMENT

Figure 3:
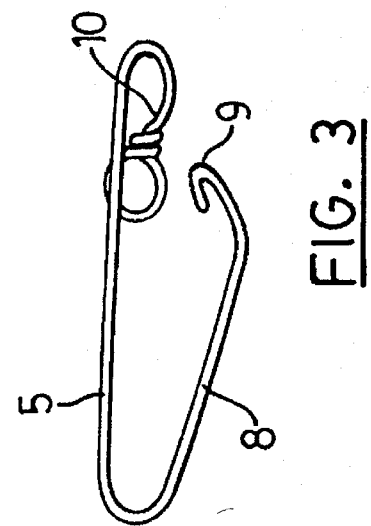
FIG. 3 is a side perspective view of the clip of the present invention in its open position.

The clip of the present invention is shown in the accompanying drawings and noted generally by the reference numeral 1. For purposes of illustration clip 1 is shown as being used to attach a fishing lure 2 to a fishing line 3. While not shown in the drawings, it will be appreciated that clip 1 could also be used to attach various other articles and devices to various other lines, ropes or cables.

Clip 1 is comprised generally of a strand of resilient wire which is formed into an elongate body 4 having a central support member 5 that bridges first and second loop portions 6 and 7, respectively. First loop portion 6 and second loop portion 7 are formed at opposite ends of central support member 5 and provide a means to attach fishing line 3 to one end of clip 1 and a hook, lure or other object to the opposite end of the clip. Preferably, fishing line 3 would be attached to second loop portion 7 while hook or lure 2 would be attached to first loop portion 6.

Figure 1:
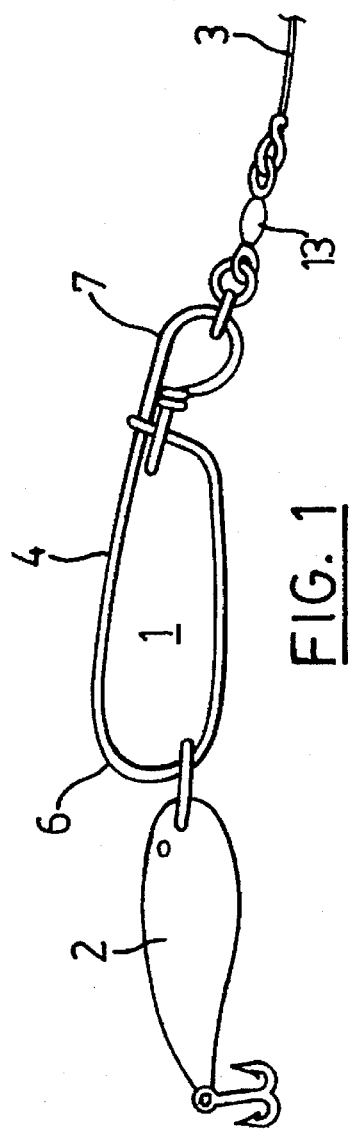
FIG. 1 is a side view of the clip of the present invention attached to a fishing lure and to a fishing line.

Clip 1 also includes a first arm member 8 that is an extension of first loop portion 6. First arm member 8 ends in a overturned u-shaped hook 9, as is shown more clearly in FIG. 3. A second arm member 10, being an extension of second loop portion 7, ends in a ring 11 that is positioned adjacent to central support member 5. As is shown more clearly in the drawings, and particularly FIGS. 1 and 5, ring 11 is positioned in close proximity to central support member 5 and in a plane that is approximately perpendicular to first and second loop portions 6 and 7. Since in the preferred embodiment hook or lure 2 is attached to first loop portion 6, first arm member 8 is designed to be releasably securable to central support member 5 so as to provide a means to readily retain or remove hook or lure 2 from clip 1. The precise structure of first arm member 8 and how it may be releasably secured to central support member 5 will be discussed further herein, however, to facilitate the opening and closing of clip 1 first arm member 8 is preferably longer than second arm member 10. Second loop portion 7 therefore takes on the configuration of a somewhat circular structure. The greater length of first arm member 8 assists a user in grasping the clip in order to open it and close it for purposes of retaining or securing a hook or lure.

Figure 4:
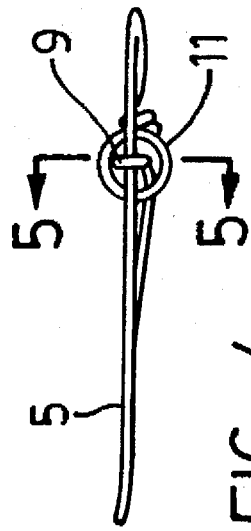
FIG. 4 is a plan view of the clip of FIG. 2.
Figure 2:
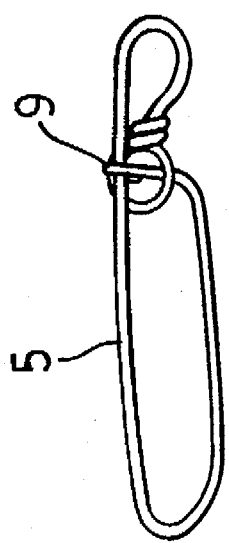
FIG. 2 is a side perspective view of the clip of FIG. 1.

As discussed above, clip 1 has an open and a closed position. FIG. 3 shows clip 1 in its open position. When clip 1 is open, overturned u-shaped hook 9 is disengaged from the remainder of the clip such that a ring or eyelet on a hook or lure can be threaded around overturned u-shaped hook 9 and slid along first arm member 8 to first loop portion 6. To close clip 1, overturned u-shaped hook 9 is directed upwardly through ring 11 to a sufficient degree that when released it will wrap around central support member 5 with its free end 12 protruding downwardly back through ring 11 on the opposite side of central support member 5 (see FIGS. 2, 4 and 5). In this fashion overturned u-shaped hook will be held securely within ring 11 and around central support member 5. A hook, lure or other object can thereby be securely attached to first loop portion 6.

To ensure the integrity of the mechanical connection between overturned u-shaped hook 9, ring 11 and central support member 5, first loop portion 6 provides a biasing force to first arm member 8 urging first arm member 8 away from central support member 5. That is, in effect first loop portion 6 acts as a spring attempting to pull overturned u-shaped hook 9 downwardly through ring 11 when clip 1 is in its closed position. However, since overturned u-shaped hook 9 is in effect wrapped around central support member 5, the biasing or spring force exerted by first loop portion 6 serves only to strengthen the mechanical connection.

Figure 5:
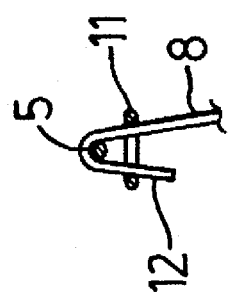
FIG. 5 is a partial sectional view taken along the line 5—5 in FIG. 4.

It will be appreciated that in order for overturned u-shaped hook 9 to be pushed upwardly through ring 11 such that it can wrap around central support member 5 as described above, central support member 5 will have to be positioned approximately above the diameter of ring 11. The width of overturned u-shaped hook 9 is less than the internal diameter of ring 11 but greater than one half of its diameter. Accordingly, in order to insert overturned u-shaped hook upwardly through ring 11, ring 11 must be laterally displaced from central support member 5 to a sufficient degree to allow passage of overturned u-shaped hook 9 past central support member 5. For this reason second loop portion 7 is designed to provide a biasing force to ring 11 in order to urge ring 11 back to its original position about central support member 5 when displaced therefrom. As a result, overturned u-shaped hook 9 may be inserted upwardly through ring 11 by laterally displacing ring 11 from its position beneath central support member 5, after which second loop portion 7 will push ring 11 back to its original position. Overturned u-shaped hook 9 can then be released to wrap around central support member 5, with free end 12 extending back downwardly through ring 11 as shown in FIG. 5.

It will be appreciated and understood that the combination of the biasing forces exerted by first loop portion 6 and second loop portion 7 must be taken into consideration when attempting to open clip 1. To release overturned u-shaped hook 9 from ring 11 and from around central support member 5, first arm member 8 must be squeezed or moved toward central support member 5 such that overturned u-shaped hook 9 no longer wraps around or engages central support member 5. At that point ring 11 may be deflected laterally away from its position below central support member 5 to allow sufficient room for overturned u-shaped hook 9 to pass downwardly through ring 11 without interference from central support member 5. Once overturned u-shaped hook 9 is free and clear of ring 11 the biasing force applied by second loop portion 7 will return ring 11 to its original position.

It will also be appreciated that the structure as described above will make it virtually impossible to release overturned u-shaped hook 9 from its closed position around central support member 5 by merely squeezing first arm member 8 toward central support member 5, as would be the case where a fish happened to bite down on first loop portion 6. That is, the structure of the present invention provides a strong and reliable means to secure a hook, lure or other object to a fishing line while relieving the possibility of clip 1 inadvertently or accidentally opening during use.

Figure 6:
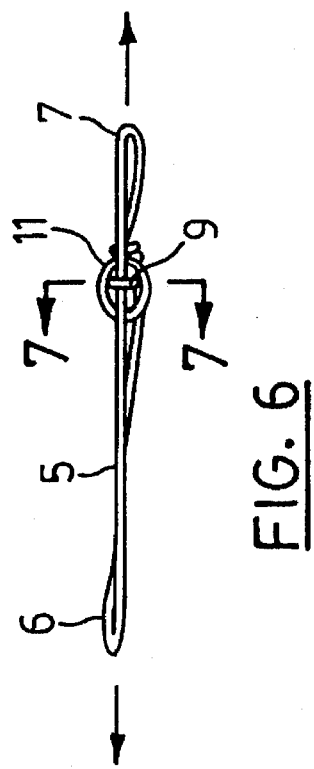
FIG. 6 is a plan view of a clip according to the present invention that has been subjected to a longitudinal deforming tensile load; and, FIG. 7 is a partial sectional view taken along the line 7—7 in FIG. 6.
Figure 7:
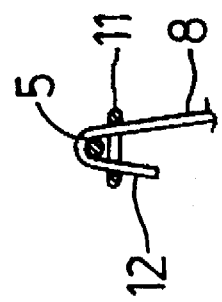

The operation of clip 1 in circumstances where it is exposed to tensile loading will now be discussed with reference to FIGS. 6 and 7. When subjected to tensile loading to the point where clip 1 undergoes deformation, elongate body 4 will tend to lengthen causing ring 11 to be pushed toward central support member 5 until it eventually comes into contact with the central support member. Accordingly, deforming clip 1 while in its closed position will effectively prevent the non-destructive removal of overturned u-shaped hook 9 from ring 11. In particular, and as shown in FIG. 7, upon the elongation of body 4 ring 11 will be forced to move upwardly into contact with central support member 5 such that overturned u-shaped hook 9 is held securely in place within ring 11 and around central support member 5. Free end 12 of overturned u-shaped hook 9 will then extend downwardly to a further degree through ring 11 than prior to deformation thereby increasing the integrity of the connection. In addition, upon tensile loading ring 11 will also tend to deform and elongate to become generally oval in shape and thereby effectively prevent the removal of overturned u-shaped hook 9 when clip 1 is in its closed position. It will therefore be appreciated and understood that unlike prior art clips the structure as described will not inadvertently or accidentally release or open under tensile loading. In fact, tensile loading and deformation or elongation of the clip has the effect of strengthening the mechanical connection between overturned u-shaped hook 9, ring 11 and central support member 5.

To enhance the use of clip 1, first and second loop portions 6 and 7, together with ring 11, have rounded and smooth edges that reduce friction when pulled through water or fluid. These smooth and rounded edges also lessen snagging on weeds and debris that may be in the water. In addition, clip 1 may include a swivel 13 attached to second loop portion 7 to allow fishing line 3 to be attached to swivel 13 thereby preventing twisting of fishing line 3. Finally, to increase durability clip 1 is preferably comprised of a corrosion resistant material.

It is to be understood that what has been described are the preferred embodiments of the invention and that it is possible to make variations to these embodiments while staying within the broad scope of the invention. Some of these variations have been discussed while others will be readily apparent to those skilled in the art. For example, while clip 1 has been described as being comprised of resilient wire, it could equally be formed from plastic, nylon, graphite, or other flexible resilient materials. In addition, as discussed clip 1 could also be used to secure various other items to a line, rope or cable and its application is not specifically limited to fishing applications.

I claim:

1. A clip for attaching fishing hooks, lures, or other objects to a line, the clip comprising:

an elongate body having a central support member bridging first and second loop portions formed at either end thereof, said first and second loop portions providing means to attach said fishing hooks, lures, or other objects to said line;

a first arm member, said first arm member being an extension of said first loop portion and ending in an overturned u-shaped hook; and, a second arm member, said second arm member being an extension of said second loop portion and ending in a ring, said ring positioned below and adjacent said central support member and in a plane approximately perpendicular to said first and second loop portions, said clip having an open and a closed position, when in said open position said overturned u-shaped hook being disengaged from the remainder of said clip, when in said closed position said overturned u-shaped hook being received upwardly through said ring and around said central support member with the free end of said overturned u-shaped hook protruding downwardly back through said ring.

2. A clip as claimed in claim 1 wherein said first loop portion provides a biasing force to said first arm member urging said first arm member away from said central support member such that when said clip is in said closed position said overturned u-shaped hook is held within said ring and around said central support member.

3. A clip as claimed in claim 2 wherein said central support member is positioned generally above the diameter of said ring, said second loop portion providing a biasing force to said ring to return said ring to said position below said central support member when displaced therefrom.

4. A clip as claimed in claim 3 wherein said overturned u-shaped hook is releasable from said closed position through the application of a first force to move said first arm member toward said central support member thereby releasing said overturned u-shaped hook from said central support member followed by the application of a second force deflecting said ring laterally away from said position below said central support member such that said overturned u-shaped hook can be removed past said central support member and removed from said ring.

5. A clip as claimed in claim 4 wherein said first and said second loop portions deform under a pre-determined tensile load thereby lengthening said elongate body and causing said ring to be pushed toward said central support member preventing the non-destructive removal of said overturned u-shaped hook therefrom when said clip is in said closed position.

6. A clip as claimed in claim 5 wherein said ring elongates and becomes generally oval in shape when sad clip is subjected to said pre-determined tensile load.

7. A clip as claimed in claim 6 wherein said first and said second loop portions and said ring have rounded and smooth edges thereby reducing friction when said clip is pulled through a fluid.

8. A clip as claimed in claim 7 including a swivel attached to said second loop portion.

9. A clip as claimed in claim 8 wherein said line is a fishing line.

10. A clip as claimed in claim 9 comprised of a corrosion resistant material.

11. A clip as claimed in claim 10 comprised of a single strand of resilient metallic wire.

* * * * *